Nov. 6, 1923.

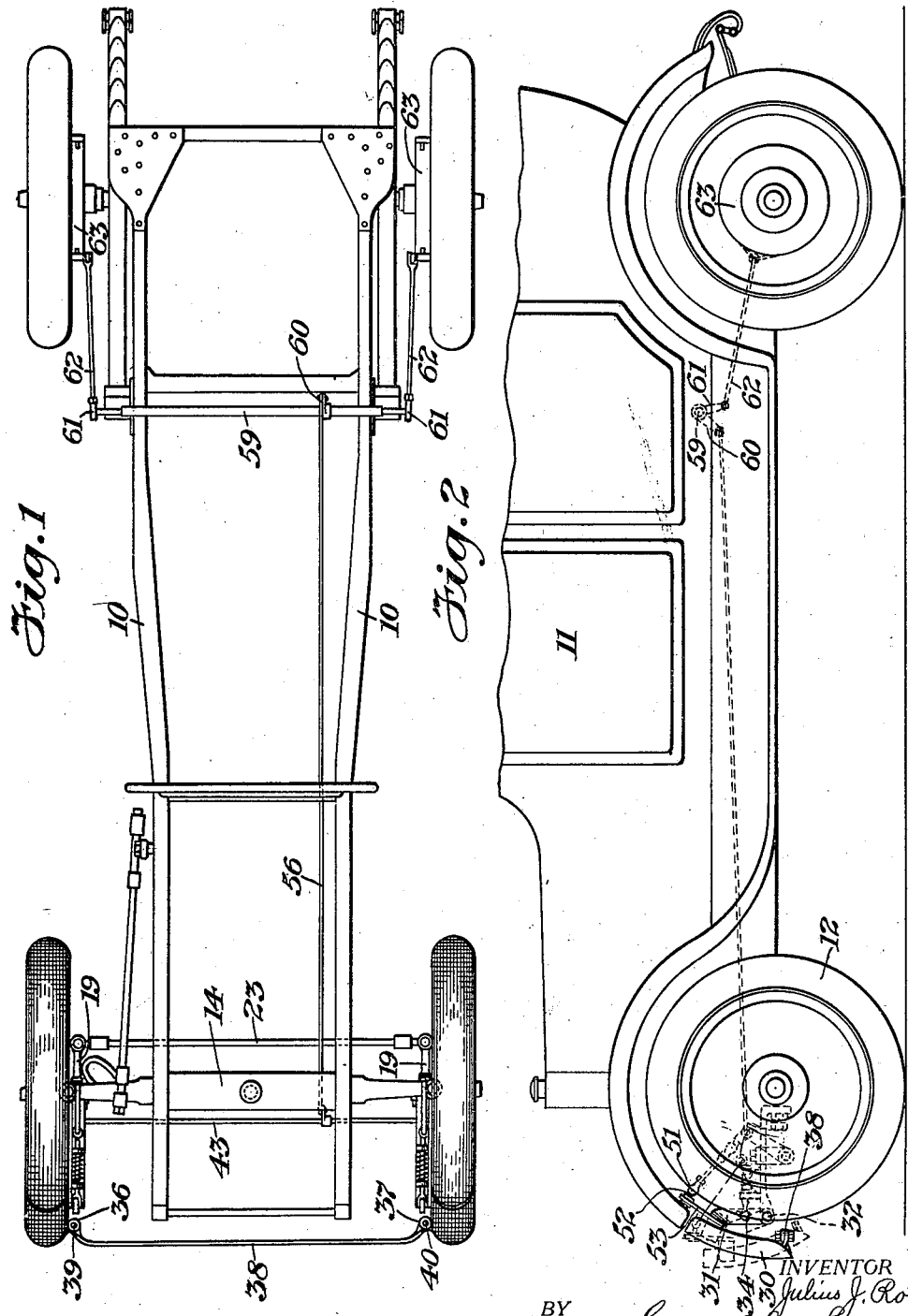

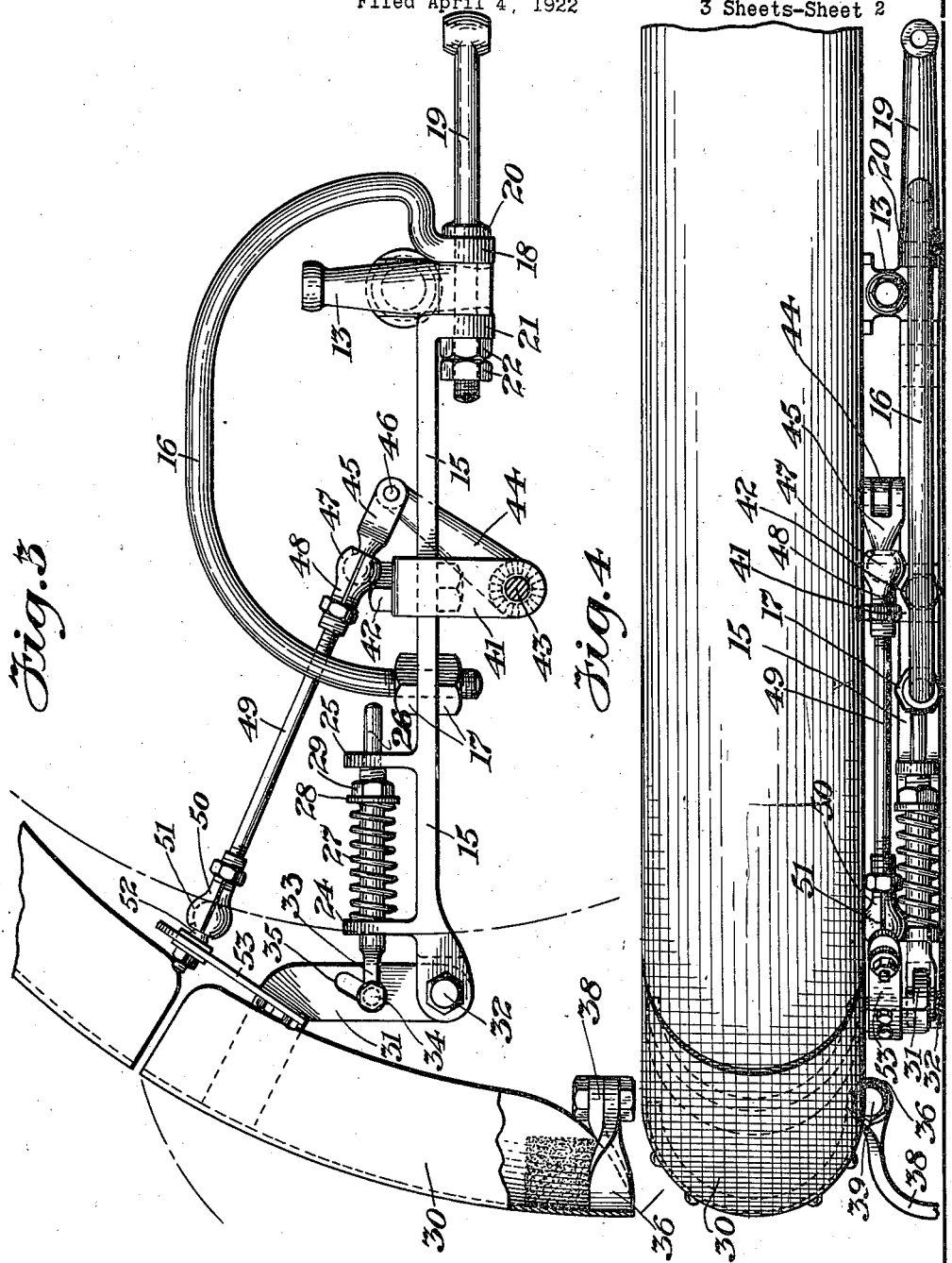

J. J. ROTH, SR 1,473,444

MOTOR VEHICLE

Filed April 4, 1922      3 Sheets-Sheet 3

INVENTOR
Julius J. Roth, Sr.
BY
HIS ATTORNEYS

Patented Nov. 6, 1923.

1,473,444

UNITED STATES PATENT OFFICE.

JULIUS J. ROTH, SR., OF NEW YORK, N. Y.

MOTOR VEHICLE.

Application filed April 4, 1922. Serial No. 549,408.

*To all whom it may concern:*

Be it known that I, JULIUS J. ROTH, Sr., a citizen of the United States, residing in the borough of Manhattan, city, county, and State of New York, have invented an Improvement in Motor Vehicles, of which the following is a specification.

This invention relates to a motor vehicle and more particularly to the devices by which the direction of the vehicle is controlled, together with various attachments therefor.

The object of my present invention is to provide a means in a motor vehicle for preventing the wheels of the vehicle from passing over the body of a person or an animal or an object of similar proportion when struck by the vehicle, and to also simultaneously and automatically apply the brakes to the vehicle to check the momentum thereof. The apparatus is so constructed that the guards or sections thereof as usually employed in the front or steering wheels of the vehicle are mounted so as to swing with the front wheels and to always be maintained in a position in alignment therewith, the said guards or sections thereof being connected by a suitable bumper bar, and normally maintained in position by a yielding device, the guards or sections thereof being adapted when moved from their normal positions to operate suitable devices for applying the brakes of the vehicle, as will be hereinafter more particularly described.

In the drawing:

Fig. 1 is a plan of the frame or chassis of a motor vehicle to which my present invention is applied.

Fig. 2 is a side elevation of the same.

Fig. 3 is an elevation on an enlarged scale illustrating the apparatus which comprises the present invention.

Fig. 4 is a plan of the same, and

Figure 5:
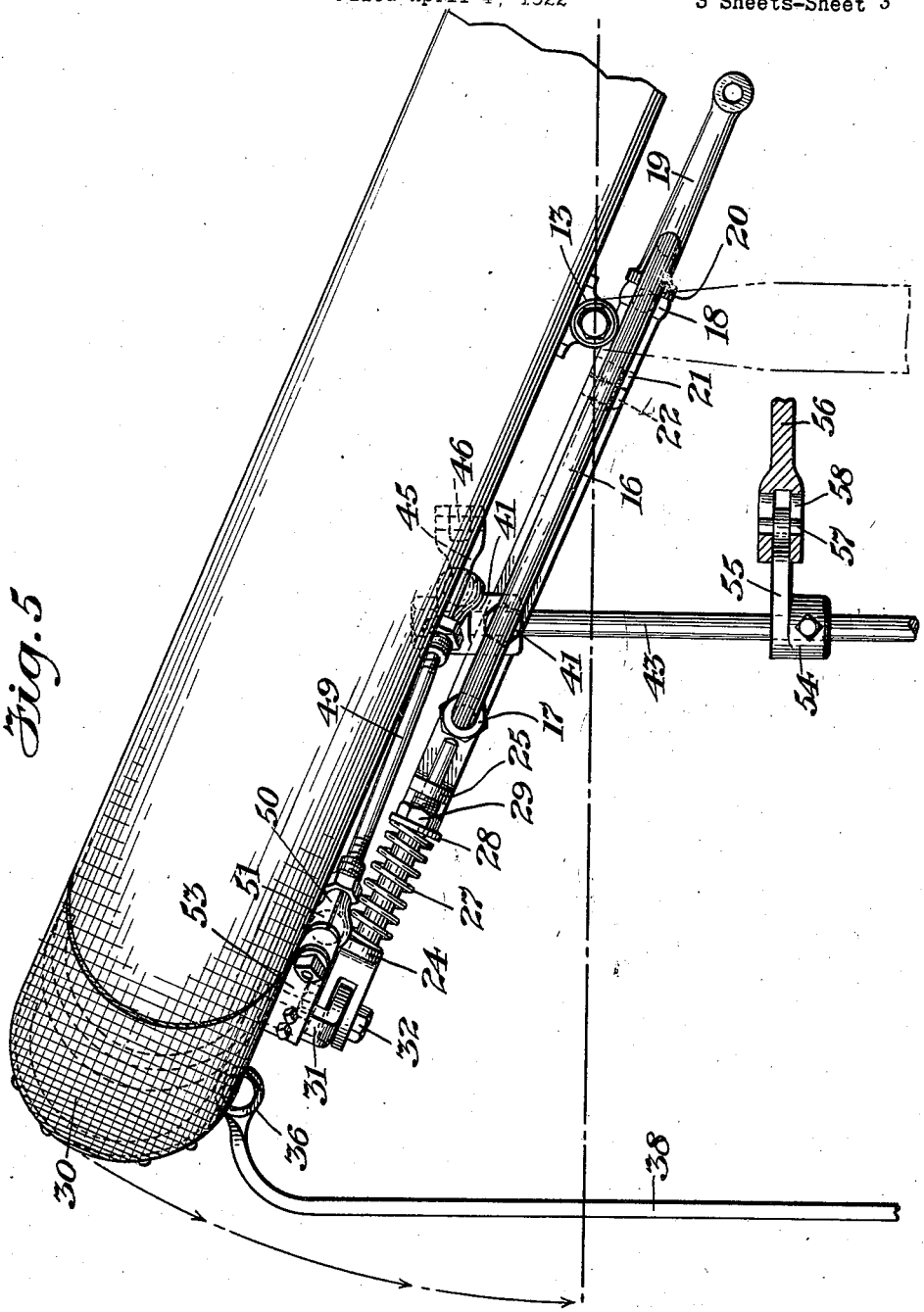
Fig. 5 is a view similar to Fig. 4, showing the parts moved from their normal right line positions.

Referring to the drawings the parts of the chassis of a vehicle are indicated at 10, and the vehicle body is designated by 11. The front wheels or wheels by which the direction of the vehicle is governed are indicated at 12 and as is customary each of these wheels is mounted upon an axle that is carried by steering knuckles 13 pivotally connected in the usual manner at the extremity of the front axle 14 of the vehicle.

The parts of the apparatus comprising my present invention are applied in a similar manner to both sides of the vehicle, being, however, reversed in position as will be understood and for this reason the following detailed description refers specifically to the parts on one side of the vehicle only. As will be seen by reference to the drawing my improved apparatus comprises a bracket 15 which is connected to the lower portion of the steering knuckle 13. This bracket is supported by an arm 16. At one end this arm is connected to the bracket approximately centrally thereof by means of nuts 17 or otherwise. At the opposite end the arm 16 is provided with an eye 18 through which the arm 19 extends. This arm 19 is the arm by which the steering knuckle is connected to the cross steering rod of the vehicle and as illustrated in this instance is provided with a flange 20 which bears against the outer surface of the eye 18, while the end of the arm passes through and is fixed in a bearing provided therefor in the lower part of the steering knuckle, while the extremity of the arm extends through the end 21 of the bracket 15 and these parts are secured in this position by means of nuts 22 or otherwise as is clearly illustrated in Fig. 3. The cross rod of the steering apparatus to which the free end of the arm 19 is pivotally connected is indicated at 23.

Adjacent the outer end of the bracket 15 there are lugs or bosses 24 and 25 preferably extending from the upper surface of the bracket and in which a plunger 26 is journaled. Surrounding the plunger 26 is a helical spring 27 bearing at one end against a face of the lug 24 and at the opposite end against a washer 28 which is adjustable to position on the plunger 26 by means of a nut 29 or otherwise so that, as will be understood the normal tendency of the spring is to force the nut 29 against the adjacent face of the lug 25 and to move the plunger 26 in a direction from left to right as viewed in Fig. 3 of the drawing. A part of a mud guard for one of the front wheels is indicated at 30 and when in alignment therewith forms a continuation of the mud guard. This section of the guard is connected to a bracket 31 by which the same is pivotally secured to the outer end of the bracket 15 as indicated at 32. The outer end of the plunger 26 is formed in the shape of a yoke 33, the arms of which span the support bracket 31. The yoke 33 is fitted with a bolt 34 which connects the ends of the yoke and passes through a slot 35 in the support bracket 31. Now, as will be understood, the action of the spring 27 acting through the plunger 26 normally maintains the support bracket 31 in the position shown in Fig. 3 in which the section of the guard is thereby supported in its normal position and may be swung on the pivotal point 32 against the action of the spring 27 when the guard or parts connected thereto come into contact with an obstruction. It will also be apparent from the foregoing that the bracket 15 and the parts associated therewith swing or turn with the steering knuckle and that consequently the pivotally mounted guard section has a like movement imparted thereto so that the same moves in unison with the wheel.

At the lower end of the guard section 30 there is a bracket 36, and similarly at the lower end of the corresponding guard section on the opposite side of the vehicle there is a bracket 37. Extending between and pivotally mounted in these brackets 36 and 37 is a bumper bar 38 which may be of any desired construction, the same being pivotally mounted in the brackets 36 and 37 as indicated at 39 and 40 respectively. Manifestly as the guard sections are turned in unison with the vehicle wheels the bumper bar 38 swings on its pivotal points and the construction is such that the bumper bar always maintains a position transverse or at right angles to the direction of the travel of the steering wheels.

Pivotally connected to the bracket 15 is a hanger bracket 41. This hanger bracket as illustrated is connected to the bracket 15 by a bolt 42 but any suitable connection may be made to secure the hanger bracket in position in such a manner that the same will turn on the bolt or other connection by which these parts are secured one to the other. A cross rod 43 is journaled adjacent one end in the hanger bracket 41 and at its opposite end in the hanger bracket corresponding to the hanger bracket 41 at the opposite side of the vehicle. Suitably connected to the cross rod 43 is a crank arm 44, and pivotally connected at the end of the crank arm is a link 45, the pivotal connection between these parts being indicated at 46. At the opposite end of the link 45 there is a spherical head 47 received in and cooperating with a socket 48 with which the same forms a universal joint. The socket 48 is adjustably mounted on one end of a rod 49, at the opposite end of which there is adjustably connected a socket 50 similar to the socket 48 and within which there is a spherical head 51 connected to a link 52 which is secured to an arm or extension 53 carried by the support bracket 31. As illustrated the arm 53 is bolted to the support bracket 31. It will be understood, however, that this arm 53 may be formed as an integral structure with the support bracket 31. It will also now be understood that in the swinging movement of the vehicle wheels the cross rod 43 maintains a position parallel to the bumper bar 38 by reason of the fact that the hanger brackets 41 are mounted to swing in the brackets 15.

Mounted in a suitable position on the cross rod 43 is a collar 54, and the collar 54 carries a crank arm 55. This crank arm 55 is connected to a brake rod or strap 56 by a pin 57 or otherwise. As illustrated particularly in Fig. 5 the end of the brake rod 56 is bifurcated and slotted as shown at 58. The brake rod 56 is connected in any suitable manner to the levers for operating the brakes of the vehicle, and as will be apparent the reason for the slot 58 is to permit the operation of the brakes manually when necessary without operating or interfering with the operation of the sections of the guards and the parts connected thereto as hereinbefore described. As illustrated in the drawing, particular reference being made to Figs. 1 and 2, the brake rod 56 is connected to a brake bar 59 by means of arms 60 and 61, and as is customary the brake bar 59 is connected by suitable rods 62 to the brake band 63 of the vehicle. These connections however are only diagrammatic as any suitable connections to the brake devices may be employed, and these by themselves form no part of my invention.

In the use of the apparatus hereinbefore described, it will now be apparent that in swinging the front wheels of the vehicle by which the direction of the same is determined the front guards or sections thereof will be moved in unison with the wheels so as to be maintained in alignment therewith at all times in the operation of the vehicle; and furthermore that upon the vehicle striking an obstruction either by the bumper bar or either of the sectional guards coming into contact with an obstruction the guards will be moved downwardly on their pivotal points to act as fenders and in so moving will operate the devices for applying the brakes of the vehicle.

I claim as my invention:

1. In a vehicle and in combination with the wheels for determining the direction of the travel of the vehicle, a mud guard, a mud guard extension, means for pivotally mounting the mud guard extension to swing in the plane of the wheel, means for yieldingly maintaining the mud guard extension in a normally elevated position, and devices whereby the mud guard extension is caused to swing simultaneously with the wheel to be maintained in alignment therewith.

2. In a vehicle and in combination with the wheels for determining the direction of the travel of the vehicle, a mud guard, a mud guard extension, means for pivotally mounting the mud guard extension to swing in the plane of the wheel, means for yieldingly maintaining the mud guard extension in a normally elevated position, a brake rod, means actuated by the mud guard extension when moved in the plane of the wheel for actuating said brake rod, and devices for moving the guard in unison with the wheel to maintain the same in alignment therewith.

3. In a vehicle and in combination with the front wheels thereof, a mud guard associated with each front wheel, a mud guard extension for each mud guard, means for yieldingly supporting each mud guard extension in a normally elevated position, and means for moving the said mud guard extensions simultaneously with the wheels to maintain the said mud guard extensions in alignment with the wheels.

4. In a vehicle and in combination with the front wheels thereof, a mud guard for each front wheel, a mud guard extension associated with each mud guard, means for pivotally mounting each mud guard extension to swing in the plane of the wheel with which it is associated, means for yieldingly maintaining each mud guard in a normal position, means actuated by the said mud guard extensions when moved on their pivotal points for actuating the brakes of the vehicle, and devices whereby said mud guard extensions are moved simultaneously with the front wheels to be maintained in alignment therewith.

5. In a vehicle and in combination with the front wheels and steering knuckles upon which the said front wheels are mounted, a bracket connected to each steering knuckle, a mud guard for each front wheel, a mud guard extension associated with each mud guard, means for pivotally mounting each mud guard extension on a bracket, means for yieldingly maintaining each mud guard in a normally elevated position, a brake rod, and means connecting the said mud guard extensions with the brake rod whereby when the mud guard extensions are moved on their pivotal points the brake rod is actuated.

6. In a vehicle and in combination with the front wheels and steering knuckles upon which the front wheels are mounted, a bracket connected to each steering knuckle, a mud guard for each front wheel, a mud guard extension associated with each mud guard, means for pivotally mounting each mud guard extension on said bracket, means for yieldingly maintaining each mud guard in a normally elevated position, and means actuated by the said mud guard extensions when swung downwardly from their normal positions for setting the brakes of the vehicle.

7. In a vehicle and in combination with the front wheels and the steering knuckles upon which the said wheels are mounted, a bracket connected to each steering knuckle, mud guards, mud guard extensions, supports connected to the mud guard extensions, means for pivotally mounting the said supports at the ends of the said brackets, a plunger mounted in each of the said brackets, means for connecting each plunger to the support for the corresponding mud guard extension, means for normally maintaining each plunger and the corresponding mud guard extension with its support in a normal position, a brake bar, and devices for connecting the brake bar and mud guard extensions so that when the mud guard extensions are moved on their pivotal points the brake rod is actuated.

8. In a vehicle and in combination with the front wheels and the steering knuckles upon which the said wheels are mounted, a bracket connected to each steering knuckle, guard members, supports connected to the guard members, means for pivotally mounting the support of each guard member at the end of one of the said brackets, a plunger mounted in each of the said brackets, means for connecting each plunger to the support for the corresponding guard, a spring for normally maintaining each plunger and the corresponding guard and its support in a normal position, a brake bar, a cross rod, means for suspending the said cross rod from the said brackets, means for connecting the said brake bar to the said cross bar, and devices for connecting the said cross bar to the said guard members.

9. In a vehicle and in combination with the front wheels and the steering knuckles upon which the said wheels are mounted, a bracket connected to each steering knuckle, guard members, supports connected to the guard members, means for pivotally mounting the support of each guard member at the end of one of the said brackets, a plunger mounted in each of the said brackets, means for connecting each plunger to the support for the corresponding guard, a spring for normally maintaining each plunger and the corresponding guard and its support in a normal position, a brake bar, a cross rod, means for suspending the said cross rod from the said brackets, means for connecting the said brake bar to the said cross bar, a connecting rod and universal joints for connecting the said cross rod to the said guard members.

Signed by me this 27th day of March, 1922.

JULIUS J. ROTH, Sr.